United States Patent [19]
Poggi

[11] Patent Number: 5,863,667
[45] Date of Patent: Jan. 26, 1999

[54] ELEMENT MADE OF COMPOSITE MATERIAL WITH ASSEMBLY (ASSEMBLIES) FOR ELECTRICAL CONTINUITY THROUGH THE ELEMENT

[75] Inventor: René Jérôme Poggi, Aix en Provence, France

[73] Assignee: Eurocopter France, Marignane Cedex, France

[21] Appl. No.: 570,217

[22] Filed: Dec. 11, 1995

[30]   Foreign Application Priority Data

Dec. 16, 1994 [FR]  France .................................. 94 15194

[51] Int. Cl.⁶ ........................... B32B 15/08; B32B 15/14; H05K 9/00
[52] U.S. Cl. ....................... 428/608; 428/626; 174/35 C; 174/35 MS; 361/218
[58] Field of Search ....................... 428/608, 626, 428/624; 361/216, 217, 218; 174/35 MS, 35 C

[56]        References Cited

U.S. PATENT DOCUMENTS

| | | | |
|---|---|---|---|
| 3,347,978 | 10/1967 | Simon et al. | 174/35 MS |
| 3,906,308 | 9/1975 | Amason | 317/2 E |
| 3,989,984 | 11/1976 | Amason et al. | 361/218 |
| 4,352,142 | 9/1982 | Olson | 361/218 |
| 4,529,836 | 7/1985 | Powers et al. | 174/94 R |
| 4,576,776 | 3/1986 | Anderson | 264/510 |
| 4,737,618 | 4/1988 | Philippe | 219/548 |
| 4,965,408 | 10/1990 | Chapman et al. | 174/35 MS |
| 4,977,296 | 12/1990 | Hemming | 174/35 MS |
| 5,239,125 | 8/1993 | Savage et al. | 174/35 MS |
| 5,250,342 | 10/1993 | Lang et al. | 361/218 |
| 5,386,345 | 1/1995 | Matsuzaki et al. | 361/816 |
| 5,595,801 | 1/1997 | Fahy et al. | 174/35 MS |

FOREIGN PATENT DOCUMENTS 2 687 195   2/1992   France .

Primary Examiner—John J. Zimmerman

[57]        ABSTRACT

The subject of the invention is an element made of composite material comprising an organic matrix which is reinforced with mineral or organic fibres, as well as at least one assembly with partial superposition of at least two electrically conductive elongate members, which assembly is essentially embedded in the matrix so as to ensure electrical continuity through the element, at least one junction piece, with a conductive coating or made of a conductive metal or alloy, being interposed between superposed portions of said elongate members of each assembly and held in permanent contact with these portions in the composite material by soldering, which links the piece to the elongate members and is preferably carried out during the heat treatment for forming the composite element.

8 Claims, 4 Drawing Sheets

FIG. 3.
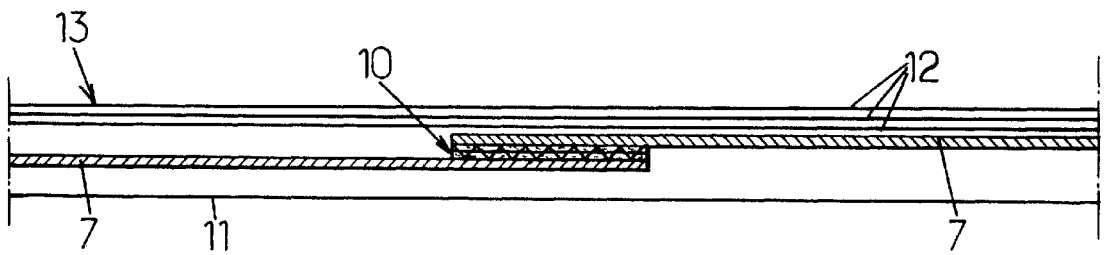
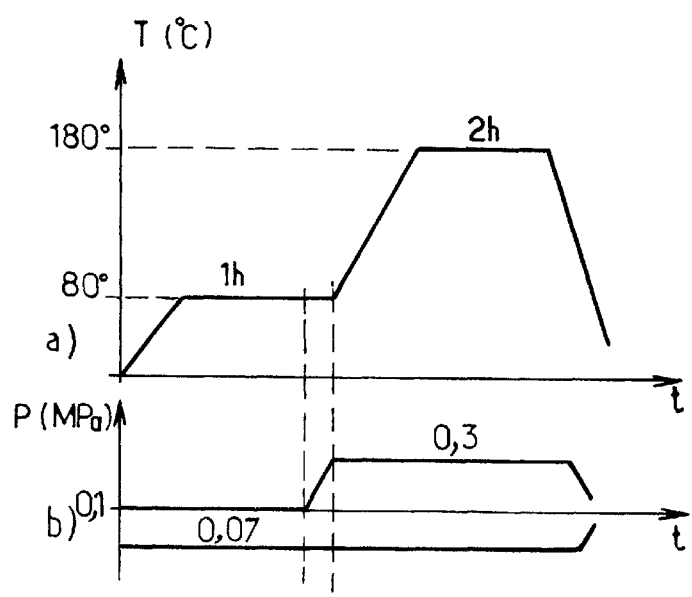
FIG. 4.

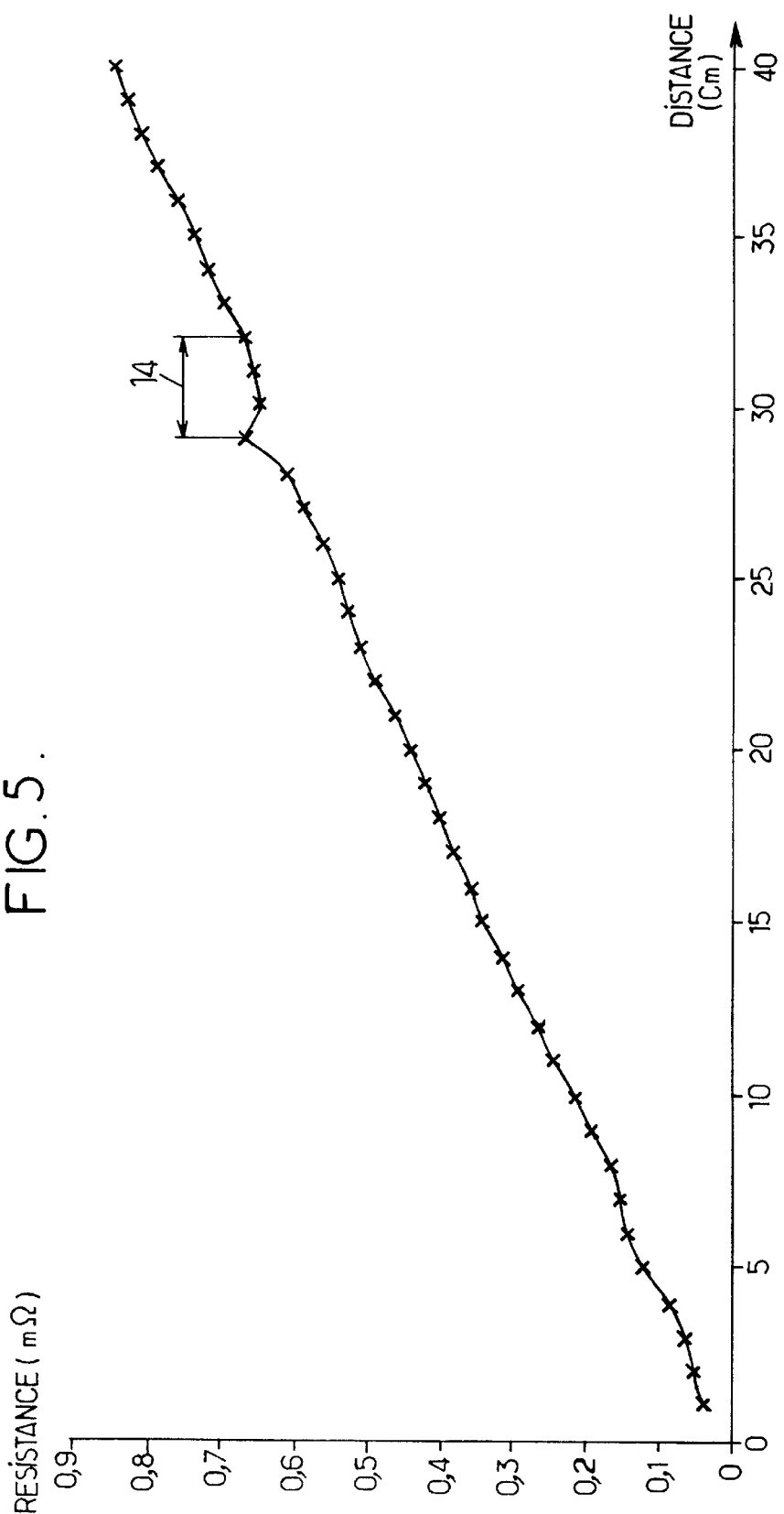

ELEMENT MADE OF COMPOSITE MATERIAL WITH ASSEMBLY (ASSEMBLIES) FOR ELECTRICAL CONTINUITY THROUGH THE ELEMENT

CROSS-REFERENCE TO RELATED APPLICATIONS

Not applicable

STATEMENT REGARDING FEDERALLY SPONSORED RESEARCH OR DEVELOPMENT

Not applicable

BACKGROUND OF THE INVENTION

1. Field of the Invention

The subject of the invention is an element made of composite material, comprising at least one assembly intended to ensure electrical conductivity through the element, the composite material being of the type comprising an organic matrix which requires a heat treatment in order to reach a critical rigidifying and/or shaping temperature and is reinforced with mineral or organic fibres, the critical temperature being a polymerization temperature in the case of a thermosetting matrix and a shaping temperature, for example shaping by moulding, in the case of a thermoplastic matrix.

The subject of the invention is also the process for manufacturing this element, as well as its use in aeronautics.

2. Description of the Prior Art

The "metallization" of the elements or pieces made of composite materials, that is to say the measures taken to ensure electrical continuity through these elements or pieces, is a necessary requirement in the aeronautical field in order to ensure, in particular, protection of the onboard electrical equipments from electromagnetic interference when the aircrafts carrying these equipments are, at least partly, produced using such elements. The object of the invention is, among others, to allow the electrostatic charges, which may originate from electrical stresses for example, to flow away.

In practice, an electrically conductive mesh is interposed in a stack of layers of composite materials, these layers being intended to form a fuselage panel for example, something which amounts to conferring the properties of a Faraday cage on the fuselage of an aircraft produced in this way. Thus, the interior of the fuselage becomes electrically isolated, the mesh allowing the electric charges to drain away.

However, such a structure turns out not to be sufficient to allow high-intensity currents to pass, for example those due to lightning. In this case, the electrical discharge may not be completely drained away by the simple mesh and it runs the risk of adversely affecting the composite element in question and of putting the aircraft in danger.

As a general rule, the remedy consists in arranging in addition, in the stack of layers of composite materials, copper shims, generally in the form of narrow tapes.

Experience shows that these shims, inserted into the composite materials, deform during the heat treatment which the organic matrices of these materials undergo (during the hot polymerization in the case of thermosetting matrices or during hot shaping and/or moulding in the case of thermoplastic matrices). During this operation thermal stresses appear. This may result, in particular, in disbondments or fractures which adversely affect the characteristics of the elements in question.

This may also result in undulations in the copper strips. These undulations have the effect of preventing electrical contact between two successive copper strips. Consequently, such an arrangement may not allow reliable metallization of the elements made of composite materials.

The current solution necessitates limiting these copper tapes to a length of from 0.8 to 1 m approximately, and ensuring electrical continuity by a local overlap by a few centimetres of the copper strips, taken in pairs. As a general rule, this procedure prevents the undulations in the copper tapes during heat treatments.

However, during polymerization or shaping heat treatment, the resins may insinuate between the copper bands in the overlap zones and thus impair the contacts. Consequently, it is no longer possible to ensure proper electrical conduction. It therefore becomes necessary frequently to carry out work on this kind of assembly in order to effect repairs by soldering. Provision may also be made to instal screws or rivets in order to keep the copper strips in contact in the overlap zones, but the results are never excellent (oxidation, increased electrical resistance, etc.). In addition, these operations require time and labour and are consequently expensive.

BRIEF SUMMARY OF THE INVENTION

The object of the invention is to provide an element made of composite material, comprising at least one assembly free of all the drawbacks of the elements of the prior art; in particular, each assembly must allow high-intensity electric currents to pass and must not deform or be adversely affected by the action of thermal stresses, especially during the operation of polymerizing or hot forming and/or moulding the matrix.

According to the Inventor, surprisingly and unexpectedly, it is possible not only to obtain an element made of composite material comprising at least one assembly ensuring better electrical continuity through the element than the assemblies of the prior art but, in addition, to achieve this result simply, economically and effectively, from the moment that at least one assembly with partial superposition of at least two electrically conductive elongate members is employed and that a junction piece, at least coated with a metal or alloy which is a good electrical conductor, is interposed between two superposed portions of the said elongate members of each assembly, holding the piece in permanent contact with the said superposed portions.

More precisely, the element made of composite material in accordance with the invention, comprising an organic matrix which has a critical rigidifying and/or shaping temperature and is reinforced with mineral or organic fibres chosen, in particular, from the group comprising carbon, glass and aramid fibres, as well as at least one assembly with partial superposition of at least two elongate members of a first electrically conductive metal or alloy having a melting point substantially greater than the said critical temperature of the matrix, the assembly being essentially embedded in the matrix so as to ensure electrical continuity through the element, is characterized by the fact that at least one junction piece, consisting at least partly, on the surface, of a second electrically conductive metal or alloy having a melting point substantially less than the melting point of the said first metal or alloy, is interposed between superimposed portions of the said elongate members of each assembly, with which portions the said junction piece is held in permanent contact by soldering the said second metal or alloy to the said first metal or alloy.

According to a preferred embodiment, the elongate members of the first metal or alloy are foils, tapes or strips, known per se.

The reason for this is that such elongate members allow the electric charges to drain away properly and, at the same time, can be easily integrated into the composite materials.

According to one advantageous embodiment, the junction piece comprises a supporting structure, preferably in the form of a substantially plane piece, made of a third electrically conductive metal or alloy, having a melting point substantially greater than the critical temperature of the matrix, and including an at least partial coating made of the said second metal or alloy whose melting point is substantially less than the melting point of the said third metal or alloy. This makes it easier both to integrate the junction piece into the composites and to obtain good bonding, by soldering, of the coating made of the said second metal or alloy of the junction piece to the said first metal or alloy of the elongate members.

Furthermore, in this way, it may be even more certain that the electric charges drain away, rapidly and effectively. It is preferred to employ a junction piece whose plane piece of the third metal or alloy takes the form of a grid, a mesh or a trellis, at least partly coated with the second metal or alloy, preferably having a thickness of between 0.05 mm and 2 mm. Plane junction pieces are thus obtained which are particularly suitable for ensuring good electrical conductivity and proper draining-away of the charges, in particular if the third metal or alloy is chosen from the group comprising the alloys of copper, of aluminium and of nickel, whereas the first metal or alloy is chosen from the group comprising copper, aluminium, stainless steel and nickel, and the second metal or alloy is chosen from the group comprising indium, nickel, tin, lead, zinc and eutectic alloys, especially of the aforementioned metals. In addition, such a junction piece is simple to arrange in the stack of the composite layers of the element to be produced.

It is particularly advantageous to produce an element having copper shims as the elongate members and a mesh made of bronze impregnated with indium as the junction piece between two superimposed portions of the copper shims. The reason for this is that these metals are particularly good conductors and are inexpensive, and indium, which has a low melting point (156.2° C.), is simple to deposit, as a coating on the bronze for example, and use in order to produce a low-melting-point solder joint.

In an embodiment providing a better quality of soldered joint connecting the junction piece to the elongate members, and which is economical in terms of manufacturing time, as it avoids having to deposit a coating made of the said second metal or alloy on a supporting structure, such as a mesh, made of the said third metal or alloy, the said junction piece consists just of the said second metal or alloy. Advantageously, the said junction piece is a flat and thin wafer of this second metal or alloy, so as to present homogeneous surfaces for bonding to the elongate members, and this wafer is arranged in a window made in a layer of reinforcing fibres, which layer is also interposed between the superimposed portions of the elongate members to which the wafer is soldered.

Each assembly of at least two elongate members and of at least one junction piece may be produced in a first step and then inserted, in a second step, into a stack of composite layers before the heat treatment for rigidifying and/or shaping the stack. However, it is particularly advantageous, in order to achieve a considerable reduction in the duration and complexity of manufacture, and therefore also in the costs, for the melting point of the second metal or alloy to be substantially less than the critical temperature of the matrix. This makes it possible to insert the elongate members and the junction pieces, which are not soldered together, into the stack of the composite layers of the element before the heat treatment for rigidifying and/or shaping the stack, and to solder the second metal or alloy of the junction pieces to the first metal or alloy of the elongate members during the heat treatment allowing the critical temperature of the matrix to be reached, this being necessary for it to become rigid and/or to be shaped, in order to obtain a finished and usable composite element.

The element made of composite material according to the invention may be used in particular in the field of aeronautics and especially for the manufacture of helicopter rotor blades or hubs or for the manufacture of fuselage or cowling panels, hatches or doors of aeroplanes and of helicopters.

The process for manufacturing an element according to the invention is characterized by the fact that:

in a first step, at least one junction piece is produced by making it at least partly, on the surface, from the second electrically conductive metal or alloy, this being chosen in particular from the group comprising indium, nickel, tin, lead, zinc and eutectic alloys, in particular of the aforementioned metals;

in a second step, at least one assembly is prepared by interposing at least one junction piece obtained according to the first step between superimposed portions of at least two elongate members produced in the first electrically conductive metal or alloy, this being chosen in particular from the group comprising copper, aluminium, stainless steel and nickel; and in a third step, the element is produced by inserting at least one assembly prepared according to the second step into a composite material and by carrying out a heat treatment enabling the critical temperature of the matrix of this material to be reached. This heat treatment is that required by the matrix, that is to say a polymerization or shaping heat treatment depending on whether the resin or resins of the matrix is or are thermosetting or thermoplastic, and, possibly and simultaneously, a heat treatment for joining the junction piece or pieces to the conductive elongate members by soldering the second metal or alloy to the first, if the second metal or alloy has a melting point substantially less than the said critical temperature of the matrix.

According to a first variant of the process of the invention, in the first step, the junction piece is produced by depositing, for example using a wave technique, by means of a soldering iron, a coating of the second metal or alloy on a supporting structure shaped as a substantially plane piece produced in the said third electrically conductive metal or alloy and chosen in particular from the group comprising the alloys of copper, of aluminium and of nickel.

According to a second variant of the process, in the first step, the junction piece is produced by compressing and/or rolling at least one little piece of the said second metal or alloy into a substantially flat and thin wafer and, in the second step, before superposition, one with respect to the other, of the said superimposed portions of the two elongate members, the wafer is arranged in a window made in a layer of reinforcing fibres, which layer is arranged on one of the said superimposed portions.

According to an even more preferred embodiment, in the second step of the process, at least one junction piece is held between superimposed portions of the elongate members by means of an adhesive or adhesively bonding substance which, in the second variant of the process, may be a resin for impregnating a small strip of a layer of reinforcing fibres covering the window receiving the wafer, this resin being of the same class as the resin or resins of the matrix of the composite material.

In this way, the manufacture of the element made of composite material is easier since correct positioning of the junction piece between the superimposed portions of the elongate members is ensured.

According to an even more advantageous embodiment, in particular for the formation of the composite material, in the third step of the process, the heat treatment is carried out at an underpressure of between approximately 0.05 MPa and approximately 0.01 MPa in a vacuum bag within an autoclave, firstly at a temperature of between approximately 60° C. and approximately 120° C., for a duration of between approximately 0.5 h and approximately 1.5 h, and then at a temperature of between approximately 140° C. and approximately 220° C., for a duration of between approximately 1 h and approximately 3 h and at a pressure of between approximately 0.15 MPa and 0.55 MPa.

This heat treatment is particularly economical and effective. It also turns out that the apparatus used for implementing it is a standard apparatus, which therefore does not require any special installations.

It should also be noted that the required conditions, especially those of pressure and temperature, are conditions which are relatively easy to achieve.

BRIEF DESCRIPTION OF THE SEVERAL VIEWS OF THE DRAWINGS

The invention will be even more clearly understood with the aid of the non-limiting examples which follow and in which two advantageous embodiments of the invention are indicated. These examples are described with reference to the appended drawings in which:

FIG. 3 is a diagrammatic cross-sectional view of a laminated element made of composite material incorporating an assembly according to FIG. 2;

FIG. 4 shows, at a) and b), temperature and pressure curves as a function of time, corresponding to the heat treatment for forming the element made of composite material of FIG. 3;

FIG. 5 is a curve of the measurement of the electrical resistance as a function of the distance in the element of FIG. 3;

DETAILED DESCRIPTION OF THE INVENTION

The example described with reference to FIGS. 1 to 3 relates to the manufacture of a laminated element made of composite material, comprising copper shims or tapes joined together by a bronze mesh covered with indium, in order to ensure electrical continuity in the element.

It is proposed to manufacture an element made of composite material in accordance with the invention which comprises a synthetic organic matrix made of a thermosetting resin, of the so-called "180° C. class", that is to say the polymerization temperature of which is 180° C., such as an epoxy resin, reinforced with glass fibres and carbon fibres in superimposed layers, as well as an assembly with partial superposition of two copper shims or tapes approximately 40 mm wide, between which a bronze mesh partially coated with indium is interposed.

In a first step, the impregnation or coating of a bronze mesh is carried out using indium. To do this, a substantially square bronze mesh 1, each side being approximately 30 mm, is fluxed using a product for fluxing copper or copper alloys before soldering, such as the one marketed under the name HARAFLUX, and then the bronze mesh is thoroughly rinsed in hot water and dried in air at 60° C.

Figure 1:
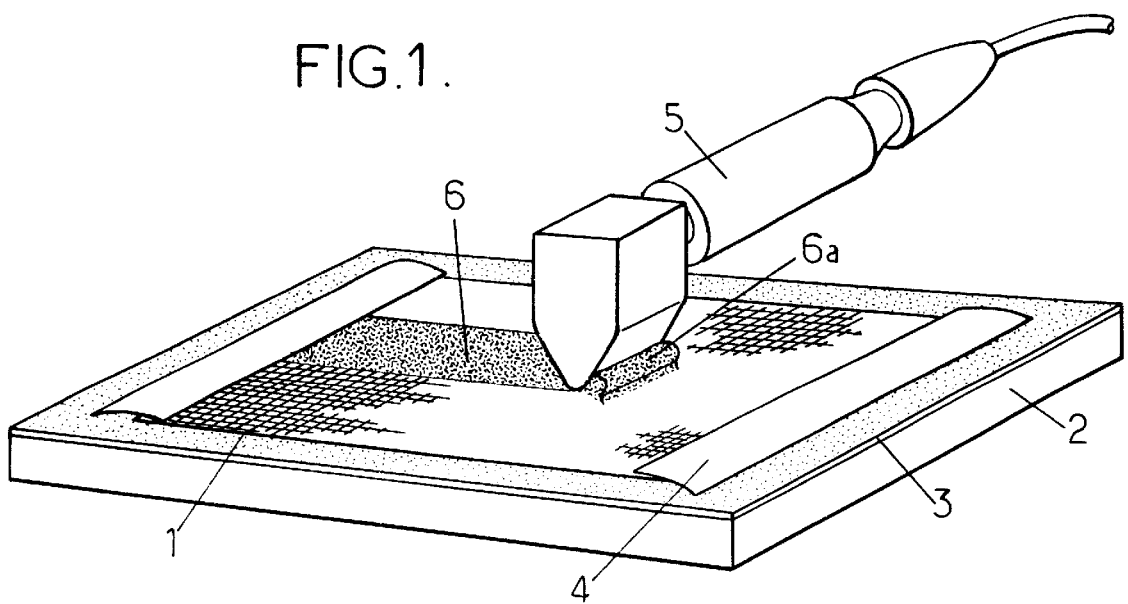
FIG. 1 is a diagrammatic perspective view representing the preparation of a first example of a junction piece.

The mesh 1 thus prepared is placed on a plane wooden support 2, as shown in FIG. 1. The mesh 1 is held on the support 2 by means of a single-sided adhesive 3, for example made of PTFE, adhesively bonded to the support 2 and upon which the mesh 1 is held in place by means of a single-sided adhesive 4 adhesively bonded along two opposite sides of the mesh 1 and on those parts of the support 2 which are adjacent to these two opposite sides.

The mesh 1 coated with indium 6 is obtained by deposition using a wave, passing an electric soldering iron having a wide bit 5 over the mesh 1, pushing in front of it an indium wave 6a over the mesh 1. Since the melting point of indium, a good electrical conductor, is less than that of bronze, the bronze mesh 1 is impregnated or coated with a thin layer of indium 6, the thickness of which may be between 0.05 mm and 2 mm.

Figure 2:
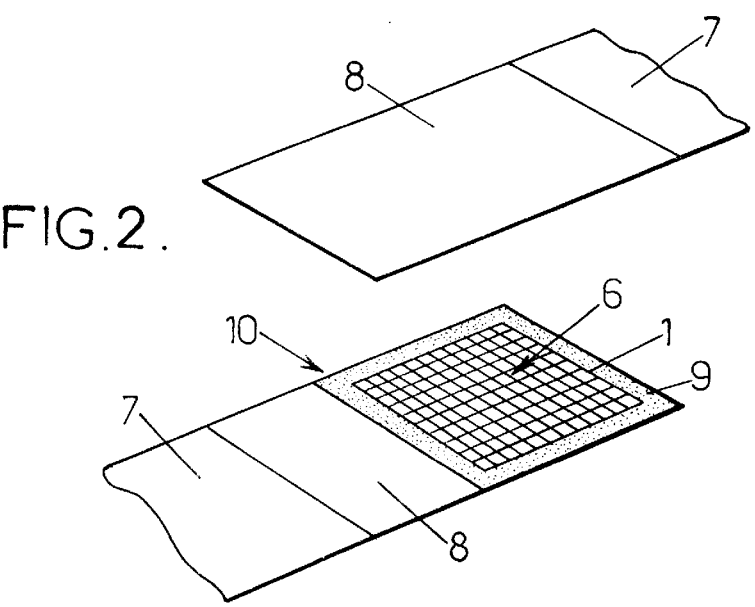
FIG. 2 is a view similar to FIG. 1 representing the preparation of an assembly with the aid of the junction piece of FIG. 1.

In a second step, an assembly 10 is produced by interposing the mesh 1 impregnated with indium 6 between two copper tapes or shims 7, as shown in FIG. 2.

To do this, two 40 mm-wide copper tapes or shims 7 are cut to the desired length and straightened out in order to remove possible undulations.

A portion 8 on one of the surfaces of each copper shim 7 is brushed in its end part which will come into superposition with the end part of the other one. Adhesively bonded to the brushed portion 8 of one of the two copper shims 7 is a double-sided adhesive film 9, for example made of silicone, having a square window in its central part, then the four sides of the mesh 1 impregnated with indium 6 are adhesively bonded to a part of this adhesive 9 around its window and then the brushed portion 8 of the other copper shim 7 is adhesively bonded to that part of the adhesive 9 which is not covered by the mesh 1, as indicated in FIG. 2.

The two superimposed ends 8 of the shims 7 are joined together by the adhesive 9 with interposition of the mesh 1 coated with indium 6. The assembly 10 may be subjected to a heat treatment, at an underpressure of 0.03 MPa below atmospheric pressure (absolute pressure of 0.07 MPa) in a vacuum bag, within an autoclave, firstly at a temperature of 80° C. for 1 hour and then at 180° C. for 2 hours at an overpressure of 0.2 MPa, as shown in curves a) and b) in FIG. 4. However, the heat treatment is preferably carried out after putting the assembly 10 in place in a stack of layers 11 and 12 of reinforcing fibres preimpregnated with the aforementioned synthetic resin, which can polymerize at 180° C., in order to form an element 13 made of composite material by the hot polymerization of the resin and by compacting the stack under pressure, as described hereinbelow in the third step, with reference to FIG. 3.

In this third step, the assembly 10 thus obtained is inserted between, on the one hand, three upper layers 12 of carbon fibres and, on the other hand, a lower layer 11 of glass fibres which are preimpregnated with epoxy resin, the fibres being made up in the form of cloths, braids, laps or rovings, these being unidirectional or crossed, depending on the structure sought for the element 13 made of composite material which it is desired to obtain (see FIG. 3). The element 13 thus obtained is subjected to a heat treatment carried out in a vacuum bag at an underpressure of 0.03 MPa (absolute pressure of 0.07 MPa) and within an autoclave, firstly at a temperature of 80° C. for 1 hour and then at a temperature of 180° C. for 2 hours, at an overpressure of 0.2 MPa after the end of the 80° C. temperature hold.

The heat treatment is shown diagrammatically by curves a) and b) in FIG. 4. In FIG. 4, $a$), the ordinate axis represents the temperature T (in °C.) and the abscissa axis represents the treatment time t (in hours). In FIG. 4, $b$), the ordinate axis represents the pressure P (in MPa) and the abscissa axis represents the treatment time (in hours).

According to FIG. 4, $b$), the underpressure of 0.03 MPa in the vacuum bag containing the laminated element 13 is maintained continuously throughout the duration of the heat treatment. At the beginning of the polymerization cycle, according to FIG. 4, $a$), the temperature rise, above room temperature, is substantially linear up to a temperature of 80° C. and is then held constant for 1 hour. A little before the end of this 80° C. temperature hold, the pressure is increased substantially linearly in the autoclave, around the vacuum bag, above atmospheric pressure until an overpressure of 0.2 MPa is reached, which is then held constant (see FIG. 4, $b$)). At the beginning of this overpressure hold, according to FIG. 4, $a$), the temperature is increased linearly from 80° C. to 180° C. in order to polymerize the resin, and is then held constant at this temperature for approximately 2 hours. Next, this temperature decreases substantially linearly from 180° C. to room temperature, and the overpressure is reduced by 0.2 MPa to atmospheric pressure during this cooling phase. Since the melting point of indium (156.2° C.) is less than the 180° C. polymerization temperature, the indium coating 6 of the bronze mesh 1 melts on coming into contact with the copper of the tapes 7 in the assembly 10 and then solidifies on cooling, ensuring a soldered joint fastening the two tapes 7 to the mesh 1. Finally, the underpressure in the vacuum bag is brought to zero, and the autoclave and then the vacuum bag may be opened in order to remove the laminated composite element thus manufactured. It should be noted that since the melting points of copper and bronze are very much greater than the polymerization temperature of the resin, the heat treatment does not damage the tapes 7 or the mesh 1.

The good electrical conductivity through the element 13 is illustrated by the graph in FIG. 5.

The graph represents the variation in electrical resistance as a function of the distance between a reference point and a measurement point moved along the copper tapes 7 on the element 13. It may be seen that the measured electrical resistance is virtually linear, including in the region of the junction zone 14 where the junction piece formed by the mesh 1 coated with indium 6 is located.

The result of this is that the assembly 10 as designed within the scope of the present invention allows good electrical continuity within an element 13 made of composite material, including in the region of the junction piece (1, 6), by virtue of the interaction of the latter (made of two materials which are good electrical conductors—bronze and indium) with the copper strips or tapes, which are good electrical conductors.

As a variant, the junction piece may be a bronze mesh coated with a knitted nickel fabric, nickel also being a good electrical conductor.

The construction of a second example of joining copper tapes together by using a junction piece, in order to ensure electrical continuity in an element made of composite material having an organic matrix, is described hereinbelow with reference to FIGS. 6$a$ to 7. It is assumed, hereinafter, that a composite element such as 13 in FIG. 3 is manufactured in a mould of conventional structure, in two parts having complementary internal cavities. The process starts by laying down, as shown diagrammatically in FIG. 6$a$, in the internal cavity of the lower part (not shown) of the mould, the layer 11 in FIG. 3, for example a layer of glass-fibre cloth, this layer being intended to form the external skin of the element 13, having a thickness of 0.05 mm and being impregnated with the epoxy resin polymerizing at 180° C. Laid onto this layer 11 is a first copper strip 7 after it has been straightened out, as in the previous example, in order to remove undulations, abraded in its end part 8 by mechanical brushing, for example by using a metal sponge, and then degreased, the copper strips 7 being handled with gloves in order to prevent any oxidation of the copper. Next, a little square or rectangular piece 14 is cut out in a layer of reinforcing fibres, which may be the same resin-impregnated glass-fibre cloth as the layer 11, and laid over the end 8 of the copper strip 7 and over the adjacent parts of the glass cloth 11, after having cut out a square-shaped window 15 in this little piece 14, which is adhesively bonded in places to the layer of cloth 11, around the end 8 of the strip 7 which this little piece 14 covers. This adhesive bonding may be provided by the impregnation resin of the little piece 14 of glass cloth. Compared to the width of the copper strip 7, of the order of from 30 to 40 mm, the dimensions of the little piece 14 of glass cloth are such that those parts of this little piece 14 which are applied against the glass cloth 11 have a width of from 10 to 15 mm, on the three sides around the end 8 of the strip 7, and such that the window 15 is surrounded, on these three sides, by a part of the little piece of glass cloth 14 covering the copper strip 7 over a width of from approximately 5 to 7 mm.

Figure 6A:
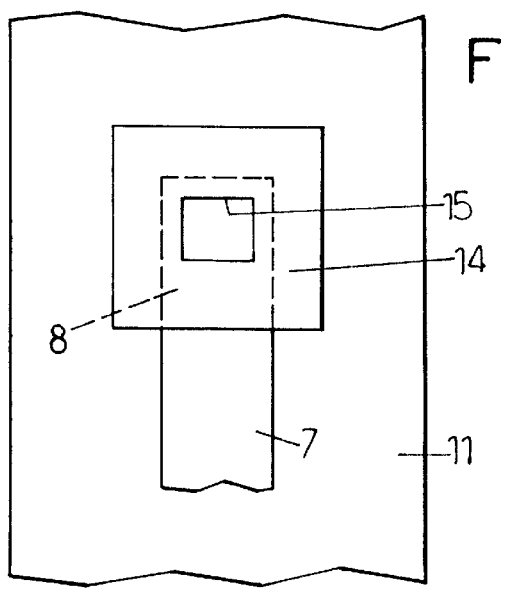
FIGS. 6a to 6c are three plan views representing three successive phases in the preparation of an assembly with the aid of a second example of a junction piece.

As shown in FIG. 6$b$, a square-shaped indium wafer 16 is then laid on the end 8 of the copper strip 7 and in the window 15 of the little piece of glass cloth 14. This wafer 16 is smaller than the window 15 cut out in the little piece of glass cloth 14 so as to leave a gap of from approximately 5 to 7 mm between the sides of the wafer 16 and those of the window 15.

The indium wafer 16 has been prepared by compressing a little piece of pure indium in a press or by rolling it between rolls, in order to convert this little piece of indium into a wafer, after having protected it by placing it between two films of a synthetic material of the type used for making vacuum bags, so as to prevent the indium from adhering to the jaws of the press or to the rolling rolls. The indium wafer thus formed has a thickness of between approximately 0.15 mm and 0.25 mm. Cut out from the flat and thin wafer thus obtained is the square-shaped wafer 16, having dimensions slightly smaller than those of the window 15 which receives it, as explained hereinabove.

Figure 6B:
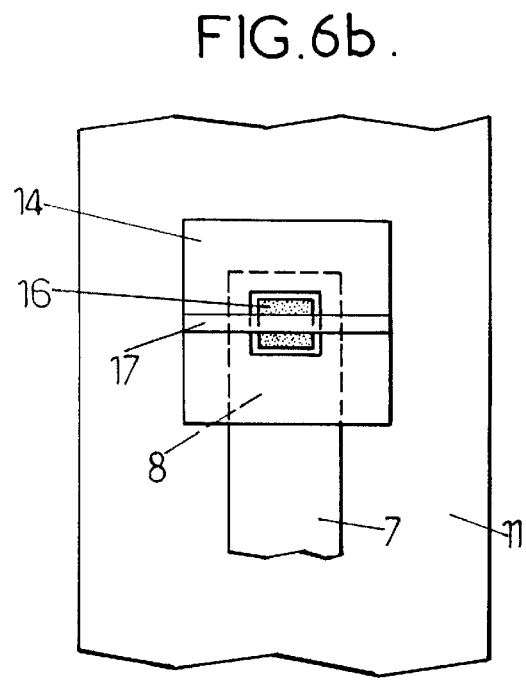

If appropriate, in order to keep the wafer 16 in place in this window 15, a small strip 17, for example from 5 to 7 mm in width, of resin-preimpregnated glass cloth, this small strip therefore being adhesive, is laid on top of the wafer 16 and the little piece of glass cloth 14, transversely to the copper strip 7, as shown in FIG. 6b.

Figure 6C:
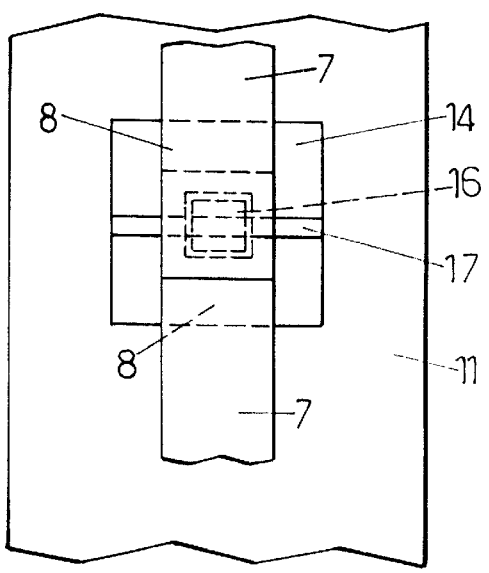
Figure 7:
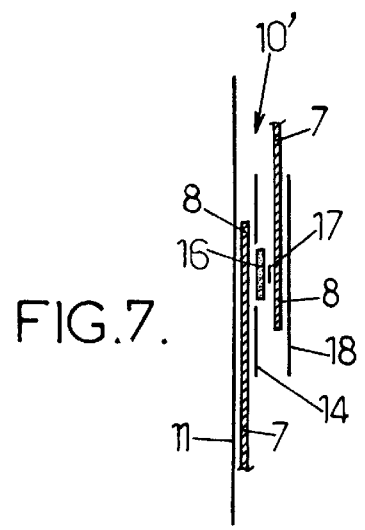
FIG. 7 is a diagrammatic longitudinal sectional view of the assembly of FIG. 6c.

Next, the second copper strip 7 is laid down, as shown in FIG. 6c, along the extension of the first strip 7, so that its end 8, having a surface prepared by being abraded and degreased, is placed on top of the stack consisting of the small strip of cloth 17, the indium wafer 16, the small piece of glass cloth 14 and the facing end 8 of the first copper strip 7. The two copper strips 7 are thus superimposed by their ends 8, as in the first example (see FIG. 2), and then the whole assembly is covered with a second little rectangular or square piece 18 of the same resin-impregnated glass cloth in order to stabilize the assembly 10' thus prepared and, in particular, to keep the copper strips 7 in superposition by their ends 8. The assembly thus prepared is shown in sectional view in FIG. 7. It is compacted by being placed in a vacuum bag connected for a minimum of one hour to a vacuum source in order to hold together all the components thus positioned. After the compacting operation, the laying-up is carried out according to the structure which it is desired to obtain, for example by stacking, on top of the copper strips 7 and the assembly 10' of FIG. 7, three layers of carbon-fibre cloth 12, as shown in FIG. 3, if it is desired to produce an element made of composite material having the same strong structure as that in FIG. 3.

The stack thus obtained is then subjected to the heat treatment ensuring polymerization of the 180° C. resin. This heat treatment may be that described hereinabove with reference to FIG. 4. During this heat treatment, the indium of the wafer 16 melts at the temperature of 156.2° C. and fills the window 15, before polymerization at 180° C.

After cooling, as in the first example, the indium wafer 16, forming a junction piece between the two copper strips 7, is soldered to the copper of the strips 7 via homogeneous surfaces, providing a soldered joint of good quality.

As mentioned hereinabove, instead of indium, it is possible to use for example nickel, tin, lead, zinc or eutectic alloys of these metals, whereas the copper strips may be replaced with for example aluminium, stainless steel or nickel strips or tapes.

When the junction piece is not entirely produced in the low-melting-point metal or alloy used to solder together the conductive strips or tapes, it is possible to use, in order to produce the plane structure carrying the low-melting-point coating, and instead of bronze, aluminium and/or nickel alloys as well as other copper alloys for example.

The invention may be applied to the manufacture of any element made of composite material which must exhibit electrical continuity, and in particular those which can be used in aeronautical construction to produce fuselage, wing or cowling panels, fuselage or wing doors and hatches, control-surface elements or box-section elements for aeroplanes and helicopters, as well as hubs or blades of helicopter rotors for example, without this list being limiting.

What is claimed is:

1. A composite element of composite material, said element comprising an organic matrix having a critical temperature reinforced with fibers; and at least one assembly comprising a partial superposition of at least two elongate members of a first electrically conductive material having a melting point substantially greater than said critical temperature of the organic matrix, said at least one assembly being essentially embedded in the organic matrix; at least one junction piece having a surface comprising a second electrically conductive material having a melting point substantially less than the melting point of said first metal or alloy, said at least one junction piece being interposed between superimposed portions of said at least two elongate members of said at least one assembly, said superposed portions holding said at least one junction piece in substantially permanent contact by soldering said second material to said first electrically conductive material, whereby electrical continuity is effected substantially throughout composite element to allow passage of high intensity currents, wherein the junction piece consists of said second material, and comprises a substantially flat, thin wafer of said second material, said wafer being arranged in a window comprising a layer of reinforcing fibers, said layer being interposed between said superimposed portions of the at least two elongate members to which the wafer is soldered.

2. An element according to claim 1, wherein the melting point of the electrically conductive material is substantially less than the critical temperature of the organic matrix.

3. An element according to claim 1, wherein the first electrically conductive material is selected from the group consisting of copper, aluminum, stainless steel, and nickel.

4. An element according to claim 1, wherein the second electrically conductive material is selected from the group consisting of indium, nickel, tin, lead, zinc, and eutectic alloys of electrically conductive material is selected from the group consisting of indium, nickel, tin, lead, zinc.

5. An element according to claim 1, wherein the at least two elongate members of the first material comprise a member selected from the group consisting of foils, tapes and strips.

6. The element according to claim 1, wherein said fibers are selected from the group consisting of mineral fibers and organic fibers.

7. The element according to claim 1, wherein said first electrically conductive material is selected from the group consisting of electrically conductive metals and electrically conductive alloys comprising at least one metal.

8. The element according to claim 1, wherein said second electrically conductive material is selected from the group consisting of electrically conductive metals and electrically conductive alloys comprising at least one metal.

\* \* \* \* \*